US012770864B2

(12) United States Patent
Ito et al.

(10) Patent No.: US 12,770,864 B2
(45) Date of Patent: Oct. 20, 2026

(54) COMPOSITE PARTICLES, NEGATIVE ELECTRODE MIXTURE LAYER AND LITHIUM-ION SECONDARY BATTERY

(71) Applicant: Group 14 Technologies, Inc., Woodinville, WA (US)

(72) Inventors: Yuji Ito, Tokyo (JP); Masato Fujita, Tokyo (JP); Akihisa Tonegawa, Tokyo (JP); Takayuki Kurita, Tokyo (JP); Hirofumi Inoue, Tokyo (JP)

(73) Assignee: Group14 Technologies, Inc., Woodinville, WA (US)

( * ) Notice: Subject to any disclaimer, the term of this patent is extended or adjusted under 35 U.S.C. 154(b) by 494 days.

(21) Appl. No.: 18/290,333

(22) PCT Filed: May 26, 2022

(86) PCT No.: PCT/JP2022/021539
§ 371 (c)(1),
(2) Date: Nov. 13, 2023

(87) PCT Pub. No.: WO2022/250109
PCT Pub. Date: Dec. 1, 2022

(65) Prior Publication Data
US 2024/0250242 A1 Jul. 25, 2024

(30) Foreign Application Priority Data
May 28, 2021 (JP) ................................ 2021-089939

(51) Int. Cl.
*H01M 4/36* (2006.01)
*H01M 4/02* (2006.01)
*H01M 4/38* (2006.01)
*H01M 4/587* (2010.01)
*H01M 10/0525* (2010.01)

(52) U.S. Cl.
CPC ........... *H01M 4/366* (2013.01); *H01M 4/386* (2013.01); *H01M 4/587* (2013.01); *H01M 10/0525* (2013.01); *H01M 2004/021* (2013.01); *H01M 2004/027* (2013.01)

(58) Field of Classification Search
CPC ...... H01M 4/366; H01M 4/386; H01M 4/587; H01M 10/0525; H01M 2004/021; H01M 2004/027
See application file for complete search history.

(56) References Cited

U.S. PATENT DOCUMENTS 6,631,073 B1 10/2003 Sakata et al.
7,037,581 B2 5/2006 Aramata et al.
7,618,678 B2 11/2009 Mao et al.
10,147,950 B2 * 12/2018 Sakshaug ............. H01M 4/587
10,424,786 B1 9/2019 Mason et al.
12,148,919 B2 11/2024 Kurita et al.
2012/0264020 A1 10/2012 Burton et al.
2013/0004841 A1 1/2013 Thompkins et al.
2013/0130115 A1 5/2013 Park et al.
2013/0196158 A1 * 8/2013 Yoshida ................ H01M 4/386 252/182.1
2013/0280601 A1 10/2013 Geramita et al.
2014/0272592 A1 9/2014 Thompkins et al.
2016/0310924 A1 * 10/2016 Nakatomi ................ B01J 13/18
2017/0062804 A1 * 3/2017 Son ......................... C23C 16/26
2017/0152340 A1 6/2017 Geramita et al.
2017/0170477 A1 6/2017 Sakshaug et al.
2017/0187032 A1 6/2017 Chang et al.
2017/0346084 A1 11/2017 Sakshaug et al.
2018/0248178 A1 8/2018 Chan et al.
2018/0375094 A1 * 12/2018 He ........................ C01B 33/021
2019/0027781 A1 1/2019 Lee et al.
2019/0221835 A1 * 7/2019 Imaji ................. H01M 10/0525
2019/0237749 A1 * 8/2019 Ulmann ................ H01M 4/134
(Continued)

FOREIGN PATENT DOCUMENTS

CN 101609891 A 12/2009
CN 102214823 A 10/2011
(Continued)

OTHER PUBLICATIONS

Jeschull "Graphite Particle-Size Induced Morphological and Performance Changes of Graphite-Silicon Electrodes", J. Electrochem. Soc. 167 100535 (Year: 2020).*
Lieu et al., "Utilization of impurities and carbon defects in natural microcrystalline graphite to prepare silicon-graphite composite anode for high-performance lithium-ion batteries," Journal of Material Science 56(31):17682-17693, Jul. 29, 2021.
Mazzoli et al., "Particle size, size distribution and morphological evaluation of airborne dust particles of diverse woods by Scanning Electron Microscopy and image processing program," Powder Technology 225:65-71, Mar. 30, 2012. (7 pages).
Xu et al., "Comparison of sizing small particles using different technologies," Powder Technology 132:145-153, Jun. 24, 2003 [Published online Apr. 4, 2003]. (9 pages).
(Continued)

*Primary Examiner* — Matthew J Merkling
(74) *Attorney, Agent, or Firm* — Seed Intellectual Property Law Group LLP

(57) ABSTRACT

One embodiment of the present invention is composite particles containing silicon and carbon, which are characterized as follows. When the cross-sectional diameter and the silicon content rate of the composite particles are measured by cross-sectional SEM-EDS and composite particles having a cross-sectional diameter of half or less than the number average of the cross-sectional diameter are defined as small diameter composite particles, the proportion of the number of the small diameter composite particles in the number of the composite particles measured is 5% or more and 50% or less, the ratio of the average silicon content rate (% by mass) of particles other than the small diameter composite particles to the average silicon content rate (% by mass) of the small diameter composite particles is 0.90 or less, and the silicon content rate of the entire composite particles is 45% by mass or more.

10 Claims, No Drawings

(56) References Cited

U.S. PATENT DOCUMENTS

| | | | |
|---|---|---|---|
| 2019/0267622 | A1 | 8/2019 | Sakshaug et al. |
| 2019/0355971 | A1 | 11/2019 | Kim |
| 2020/0020935 | A1 | 1/2020 | Costantino et al. |
| 2020/0152973 | A1 | 5/2020 | Mason et al. |
| 2022/0376263 | A1 | 11/2022 | Albano et al. |

FOREIGN PATENT DOCUMENTS

| | | | |
|---|---|---|---|
| CN | 205893385 | U | 1/2017 |
| CN | 108475779 | A | 8/2018 |
| CN | 108511686 | A | 9/2018 |
| CN | 108565437 | A | 9/2018 |
| CN | 109004203 | A | 12/2018 |
| CN | 109216686 | A | 1/2019 |
| CN | 109585781 | A | 4/2019 |
| CN | 110088949 | A | 8/2019 |
| CN | 112582589 | A | 3/2021 |
| CN | 113066968 | A | 7/2021 |
| EP | 3653576 | A2 | 5/2020 |
| EP | 3667782 | A1 | 6/2020 |
| GB | 2578797 | | 5/2020 |
| GB | 2584615 | A | 12/2020 |
| JP | 11339796 | A | 12/1999 |
| JP | 2002141069 | A | 5/2002 |
| JP | 2005025991 | | 1/2005 |
| JP | 2007008790 | A | 1/2007 |
| JP | 2007039289 | A | 2/2007 |
| JP | 3897709 | B2 | 3/2007 |
| JP | 2007234358 | A | 9/2007 |
| JP | 2008112710 | A | 5/2008 |
| JP | 2008251221 | A | 10/2008 |
| JP | 2009049236 | A | 3/2009 |
| JP | 2009526743 | A | 7/2009 |
| JP | 2009-289417 | A | 12/2009 |
| JP | 2010095390 | A | 4/2010 |
| JP | 2010525549 | A | 7/2010 |
| JP | 2010277989 | A | 12/2010 |
| JP | 2012119079 | A | 6/2012 |
| JP | 2014511322 | A | 5/2014 |
| JP | 2014514683 | A | 6/2014 |
| JP | 2014523468 | A | 9/2014 |
| JP | 2015050050 | A | 3/2015 |
| JP | 2015-69762 | A | 4/2015 |
| JP | 2015130287 | A | 7/2015 |
| JP | 2016132608 | A | 7/2016 |
| JP | 2016166116 | A | 9/2016 |
| JP | 2017088443 | A | 5/2017 |
| JP | 2017222547 | A | 12/2017 |
| JP | 2018032588 | A | 3/2018 |
| JP | 6328107 | B2 | 5/2018 |
| JP | 2018-163776 | A | 10/2018 |
| JP | 2018-534720 | A | 11/2018 |
| JP | 2019-522872 | A | 8/2019 |
| JP | 2019145212 | A | 8/2019 |
| JP | 2019179679 | A | 10/2019 |
| JP | 2020-537324 | A | 12/2020 |
| JP | 2021187708 | A | 12/2021 |
| KR | 20140112451 | A | 9/2014 |
| KR | 101560892 | B1 | 10/2015 |
| KR | 10-2018-0113187 | A | 10/2018 |
| KR | 10-2019-0122805 | A | 10/2019 |
| KR | 20200013097 | A | 2/2020 |
| WO | 2008081883 | A1 | 7/2008 |
| WO | 2013106782 | A2 | 7/2013 |
| WO | 2013192205 | A1 | 12/2013 |
| WO | 2014160385 | A2 | 10/2014 |
| WO | 2015019994 | A1 | 2/2015 |
| WO | 2016009938 | A1 | 1/2016 |
| WO | 2017040299 | | 3/2017 |
| WO | 2018163778 | A1 | 9/2018 |
| WO | 2019031597 | | 2/2019 |
| WO | 2019131861 | A1 | 7/2019 |
| WO | 2019131862 | A1 | 7/2019 |
| WO | 2020095067 | A1 | 5/2020 |
| WO | 2020/128523 | A1 | 6/2020 |
| WO | 2021091789 | A1 | 5/2021 |

OTHER PUBLICATIONS

Zou et al., "Development and optimization of porosity measurement techniques," Ceramics International 42:2861-2870, 2016 [Published online Nov. 12, 2015]. (10 pages).

* cited by examiner

COMPOSITE PARTICLES, NEGATIVE ELECTRODE MIXTURE LAYER AND LITHIUM-ION SECONDARY BATTERY

CROSS REFERENCE TO RELATED APPLICATIONS

This application is a National Stage of International Application No. PCT/JP2022/021539 filed May 26, 2022, claiming priority based on Japanese Patent Application No. 2021-089939 filed May 28, 2021.

TECHNICAL FIELD

One embodiment of the present invention relates to composite particles containing silicon and carbon, a negative electrode mixture layer containing the composite particles, and a lithium-ion secondary battery containing the negative electrode mixture layer.

BACKGROUND ART

Lithium-ion secondary batteries used in IT devices such as smartphones and tablet PCs, vacuum cleaners, electric tools, electric bicycles, drones, and automobiles require negative electrode active materials with high capacity and high output. Silicon (theoretical specific capacity: 4200 mAh/g), which has a higher theoretical specific capacity than currently used graphite (theoretical specific capacity: 372 mAh/g), has attracted attention as a negative electrode active material.

However, silicon (Si) expands and contracts in volume up to about 3 to 4 times in association with electrochemical lithiation and delithiation. As a result, the silicon particles crack or are separated from the electrode, and thus it is known that lithium-ion secondary batteries using silicon have extremely low charge/discharge cycle characteristics (hereinafter, also referred to as "cycle characteristics"). For this reason, instead of simply replacing graphite with silicon, it is now being actively studied to use a structure in which the degree of expansion and contraction of the negative electrode material as a whole is reduced. Among them, many attempts have been made to form a composite with carbonaceous materials.

One of the main characteristics of lithium-ion secondary batteries is their high volumetric energy density. To achieve such a characteristic, the positive electrode and the negative electrode need to have high electrode density and high capacity. Accordingly, the negative electrode material and positive electrode material constituting the negative electrode and positive electrode, respectively, are also required to have high powder compression density and high specific capacity.

In the present description, "electrode density" refers to the apparent density of the electrode mixture layer. "Negative electrode material" refers to the negative electrode active material. "Positive electrode material" refers to the positive electrode active material, as in the case of definition of the negative electrode material. In the present description, the positive electrode material and/or the negative electrode material may also be referred to as "electrode material".

In order to obtain electrode materials having the desired powder physical properties and electrochemical characteristics, it is widely practiced to mix electrode materials of different types or with different powder physical properties and electrochemical characteristics.

For example, JP2020-537324A (Patent Literature 1) discloses a negative electrode containing, as the negative electrode active material, artificial graphite with a specific surface area (BET) of 0.1 to 1.2 $m^2/g$ and one or more selected from the group consisting of natural graphite and temper carbon having a specific surface area larger than that of the artificial graphite.

JP2019-522872A (Patent Literature 2) discloses an electrode for a metal-ion battery provided with an active layer that is in contact with a current collector, in which the active layer contains multiple porous particles (i) containing an electroactive material selected from silicon, silicon oxide represented by the formula $SiO_x$ (in the formula, $0<x\leq1.5$), germanium, tin, aluminum, and mixtures thereof, having a $D_{50}$ particle diameter in the range 0.5 to 40 μm and an intraparticle porosity of less than 30%, and multiple carbon particles (ii) selected from one or more of graphite, soft carbon, and hard carbon, having a $D_{50}$ particle diameter in the range of 1 to 100 μm, the active layer contains at least 50% by weight of the carbon particles (ii), and the ratio of the D50 particle diameter of the carbon particles (ii) to the D50 particle diameter of the porous particles (i) is in the range of 1.5 to 30.

U.S. Ser. No. 10/424,786B (Patent Literature 3) discloses a fine particle material in which the porous carbon framework has a bimodal or multimodal pore size distribution.

CITATION LIST

Patent Literature

Patent Literature 1: JP2020-537324A
Patent Literature 2: JP2019-522872A
Patent Literature 3: U.S. Ser. No. 10/424,786B

SUMMARY OF INVENTION

Technical Problem

However, the negative electrode disclosed in Patent Literature 1 contains only graphite as the active material and no silicon, and thus its capacity can only be expected to be about that of graphite.

In the electrode for a metal-ion battery disclosed in Patent Literature 2, only the size ratio of the porous particles (i) containing the electroactive material and the carbon particles (ii) is controlled, and only the electrode density and capacity obtained by optimization of the size ratio can be expected.

The fine particle material disclosed in Patent Literature 3 focuses mainly on improvement in rate characteristics and does not necessarily improve electrode density or specific capacitance.

In addition, it is considered that, when the silicon content rate of these materials is increased, the initial specific capacity is high in the battery, but due to large expansion and contraction at the time of charging and discharging, the electrode deteriorates severely and the cycle characteristics become poor.

The problem to be solved by the present invention is to provide a negative electrode material for a lithium-ion secondary battery having high compression density, high silicon concentration, and good cycle characteristics.

Solution to Problem

As a result of diligent investigations in order to solve the above problem, the present inventors have found that, in composite particles containing silicon and carbon, by setting the proportion of composite particles having a specific particle diameter in the entire composite particles and the average silicon content rate thereof, as well as the silicon content rate of the entire composite particles, to specific ranges, the above problem can be sufficiently solved, and have thus completed the present invention.

The configuration examples of one embodiment of the present invention are as follows.

[1] Composite particles containing silicon and carbon,
in which, when the cross-sectional diameter and the silicon content rate of the composite particles are measured by cross-sectional SEM-EDS and composite particles having a cross-sectional diameter of ½ or less of the number average of the cross-sectional diameter are defined as small diameter composite particles,
the proportion of the number of the small diameter composite particles in the number of the composite particles measured is 5% or more and 50% or less,
the ratio of the average silicon content rate (% by mass) of composite particles other than the small diameter composite particles to the average silicon content rate (% by mass) of the small diameter composite particles is 0.90 or less, and
the silicon content rate of the entire composite particles is 45% by mass or more.

[2] The composite particles according to [1], in which the carbon contains a porous carbon material.

[3] The composite particles according to [1] or [2], having a pore volume of 0.10 $cm^3/g$ or less.

[4] The composite particles according to any of [1] to [3], in which the ratio of the oxygen content rate (% by mass) to the silicon content rate (% by mass) is 0.001 or more and 0.300 or less.

[5] The composite particles according to any of [1] to [4], in which a peak is present between 450 and 495 $cm^{-1}$ in the Raman spectrum.

[6] The composite particles according to any of [1] to [5], in which (peak height of SiC111 plane)/(peak height of Si111 plane) is 0.010 or less, in the XRD pattern as measured by powder XRD using the Cu-Kα radiation.

[7] The composite particles according to any of [1] to [6], in which, when the small diameter composite particles are analyzed by SEM-EDS, one or more elements selected from Al, Ti, V, Cr, Mn, Fe, Co, Ni, Y, Zr, Mo, Nb, La, Ce, Ta, and W are detected.

[8] The composite particles according to any of [1] to [7], containing:
5 to 50% by mass of composite particles (S) obtained by allowing a silane gas to act on porous carbon (S) having a $D_{V50}$ of 1.0 to 10.0 μm and a pore volume of 0.8 to 2.2 $cm^3/g$ to thereby fill in the pores of the porous carbon (S) with silicon; and
50 to 95% by mass of composite particles (L) obtained by allowing a silane gas to act on porous carbon (L) having a $D_{V50}$ greater than that of the porous carbon (S) and a pore volume of 0.2 to 0.8 $cm^3/g$ to thereby fill in the pores of the porous carbon (L) with silicon,
provided that the sum of the composite particles (S) and the composite particles (L) is 100% by mass.

[9] A negative electrode mixture layer containing the composite particles according to any of [1] to [8].

[10] A lithium-ion secondary battery containing the negative electrode mixture layer according to [9].

Advantageous Effects of Invention

The composite particles of one embodiment of the present invention have high compression density and high specific capacity, and therefore can provide a negative electrode mixture layer and a lithium-ion secondary battery with high volumetric energy density and good cycle characteristics.

DESCRIPTION OF EMBODIMENTS

Hereinafter, embodiments of the present invention will be described.

(1) Composite Particles

Composite particles of one embodiment of the present invention (hereinafter, also referred to as "the present composite particles") are composite particles containing silicon and carbon. The carbon is not particularly limited, but preferably contains a porous carbon material. When the carbon contains a porous carbon material, volume changes due to expansion and contraction of the silicon in association with lithiation and delithiation can be absorbed. The silicon is more preferably disposed in the pores of the porous carbon material, but the silicon may also be present on the surface of particles of the porous carbon material.

The composite particles of one embodiment of the present invention are controlled by the cross-sectional diameter and the silicon content rate, as measured by cross-sectional SEM-EDS. Next, an example of a cross-sectional SEM-EDS measurement method will be described.

At first, cross-sectional SEM-EDS is carried out on a group of composite particles sampled from a uniform state. For example, a scoop from a large amount of well-mixed composite particle powder using a microspatula or other means may be placed on carbon tape and sectioned using, for example, Cross Section Polisher or other means, or well-mixed powder may be embedded in resin, which is then polished to generate a cross-section.

Even in the state where other particles that are clearly different in shape and composition from the composite particles are mixed in, they can be distinguished from the composite particles by the above SEM and EDS (SEM-EDS), and therefore the cross-sectional diameter and silicon content rate of the composite particles can be examined.

Accordingly, even in such a state that the composite particles are present as an electrode mixture layer in a lithium-ion secondary battery, the cross-sectional diameter and silicon content rate of the composite particles can be examined by SEM-EDS of the cross-section. However, particles that cracked at the time of electrode pressing are excluded from the measurement subject. Whether or not cracking occurred at the time of electrode pressing can be easily discerned from the adjacent composite particle shape.

The composite particles to be measured by the cross-sectional SEM-EDS are, for example, randomly selected 100 particles. Here, the "cross-sectional diameter" in the cross-sectional SEM image of the composite particles is the diameter of the cross-section of an individual particle obtained by cross-sectional SEM observation of the composite particles, and is the equivalent circle diameter calculated from the cross-sectional area of the particle concerned using image analysis software such as ImageJ.

The number average of the cross-sectional diameter of each composite particle measured is defined as the average cross-sectional diameter of the composite particles. That is, the average cross-sectional diameter is the value obtained by dividing the sum of the cross-sectional diameter values obtained by the number of composite particles measured. Composite particles having a cross-sectional diameter of ½ or less of this average cross-sectional diameter will be referred to as "small diameter composite particles". Also, composite particles other than the small diameter composite particles will be referred to as "large diameter composite particles".

In one embodiment of the present invention, the proportion of the number of the small diameter composite particles in the number of the composite particles measured is 5% or more. The above-described proportion of 5% or more allows composite particles having a size about that of the small diameter composite particles to efficiently enter the gaps between the other particles, thereby increasing the compression density of the powder resulting from the present composite particles. From this viewpoint, the above-described proportion is preferably 10% or more, and more preferably 20% or more.

The proportion of the number of the small diameter composite particles in the number of the entire composite particles for which measurement has been carried out is 50% or less. The above-described proportion of 50% or less allows the powder to have a higher compression density since the present composite particles have fewer voids generated between particles having a size about that of the small diameter composite particles. From this viewpoint, the above-described proportion is preferably 45% or less, and more preferably 35% or less.

When analyzing the silicon content rate in the composite particles by EDS, silicon and carbon in the central part of the particle are analyzed using EDS for the cross-sectional SEM image of the composite particles for which the cross-sectional diameter measurement has been carried out, and the proportions of these elements are calculated in units of % by mass. The silicon content rates obtained from individual composite particles for which measurement has been carried out are averaged using the number of particles and the resulting number (number average) is defined as the average silicon content rate of those composite particles. That is, the average silicon content rate is the value obtained by dividing the sum of the silicon content rates of individual composite particles by the number of composite particles measured.

The numerical value obtained by number averaging only the small diameter composite particles by the above-described method is referred to as "average silicon content rate of the small diameter composite particles (x)". Also, the numerical value obtained by number averaging only the large diameter composite particles is referred to as "average silicon content rate of the large diameter composite particles (y)".

In the composite particles of one embodiment of the present invention, the value of (y)/(x) is 0.90 or less. That is, in the composite particles of one embodiment of the present invention, the small diameter composite particles have a silicon content rate higher than that of the large diameter composite particles. This is a requirement utilizing that the small diameter composite particles are considered to be less likely to crack due to expansion and contraction compared to the large diameter composite particles. This allows the silicon content rate of the entire composite particles to be higher than when all composite particles have the same silicon content rate, and thus the specific capacity of the composite particles can be increased. The value of (y)/(x) is preferably 0.85 or less, and more preferably 0.80 or less.

The silicon content rate of the composite particles of one embodiment of the present invention is 45% by mass or more. The silicon content rate of 45% by mass or more allows the present composite particles to have sufficiently high specific capacity. From this viewpoint, the silicon content rate is preferably 48% by mass or more, and more preferably 50% by mass or more.

The silicon content rate is preferably 85% by mass or less. The silicon content rate of 85% by mass or less provides good cycle characteristics in the battery. From this viewpoint, the silicon content rate is more preferably 75% by mass or less, and still more preferably 65% by mass or less.

The silicon content rate in the composite particles can be quantitatively analyzed by, for example, X-ray fluorescence analysis (XRF) or inductively coupled plasma atomic emission spectroscopy (ICP-AES). This silicon content rate may be specifically referred to as "quantitative silicon content rate".

The pore volume of the composite particles of one embodiment of the present invention is preferably 0.10 $cm^3/g$ or less. The pore volume of 0.10 $cm^3/g$ or less provides excellent initial coulombic efficiency in the battery since the specific surface area is small and decomposition of the electrolytic solution occurs only to an acceptable degree. Also, in the case where silicon is present in the pores of the composite particles, the pore volume of 0.10 $cm^3/g$ or less reduces the opportunity for silicon to come into contact with oxygen and moisture in the air, making it less likely to be oxidized. From this viewpoint, the pore volume is more preferably 0.05 $cm^3/g$ or less.

The pore volume can be obtained by analyzing the adsorption isotherm obtained by the nitrogen adsorption test using known methods. Details will be described later.

In the composite particles of one embodiment of the present invention, the ratio of the oxygen content rate to the silicon content rate is preferably 0.001 or more. Here, the unit of oxygen content rate and silicon content rate is % by mass. The above-described ratio of 0.001 or more provides excellent initial coulombic efficiency in the battery since the outermost surface of silicon is stabilized by the oxide film. From this viewpoint, the above-described ratio of the oxygen content rate to the silicon content rate is more preferably 0.002 or more, and still more preferably 0.005 or more.

In the composite particles of one embodiment of the present invention, the ratio of the oxygen content rate to the silicon content rate is preferably 0.300 or less. When the above-described ratio is 0.300 or less, the irreversible capacity due to silicon oxide is small. From this viewpoint, the above-described ratio of the oxygen content rate to the silicon content rate is more preferably 0.200 or less, and still more preferably 0.100 or less.

The oxygen content rate in the composite particles can be measured by, for example, an oxygen analyzer, which heats the sample at a high temperature with carbon in an inert gas and quantifies the CO and $CO_2$ generated using an infrared detector. The silicon content rate can be measured by the above-described XRF or ICP-AES.

In the composite particles of one embodiment of the present invention, a peak is preferably present in the range of 450 to 495 $cm^{-1}$ in the Raman spectrum. The presence of a peak in this range suggests that the composite particles contain amorphous silicon. In the composite particles of one embodiment of the present invention, it is more preferable that a peak is present in the range of 450 to 495 $cm^{-1}$ in the Raman spectrum, and not in the range of 500 to 530 $cm^{-1}$. The absence of a peak in the range of 500 to 530 $cm^{-1}$ suggests that the composite particles do not contain crystalline silicon. Since amorphous silicon is more isotropic in expansion and contraction at the time of lithiation compared to crystalline silicon, it is considered that composite particles and an electrode mixture layer can be obtained that are more resistant to mechanical deterioration.

For the composite particles of one embodiment of the present invention, in the XRD pattern as measured by powder X-ray diffraction (powder XRD measurement) using the Cu-Kα radiation, (peak height of SiC111 plane)/(peak height of Si111 plane) is preferably 0.010 or less. The above-described ratio of 0.010 or less provides a higher specific capacity since the composite particles are more free from silicon carbide (SiC). From this viewpoint, the above-described ratio is more preferably 0.005 or less, still more preferably 0.001 or less, and most preferably 0.000. The above-described ratio is also denoted as $(I_{SiC111})/(I_{Si111})$.

The composite particles of one embodiment of the present invention may have a coating layer on the particle surface. Specific examples of the coating include carbon coating, inorganic oxide coating, and polymer coating. Examples of the techniques of the carbon coating include chemical vapor deposition (CVD) and physical vapor deposition (PVD). Examples of the techniques of the inorganic oxide coating include CVD, PVD, atomic layer deposition (ALD), and wet methods. The wet method includes a method of coating composite particles with a liquid obtained by dissolving or dispersing a precursor of an inorganic oxide (metal carboxylate or alkoxide) in a solvent, and removing the solvent by heat treatment or other means. As for the type of polymer coating, a method of coating using a polymer solution, a method of coating using a polymer precursor containing a monomer and polymerizing by applying, for example, temperature or light, or a combination thereof may be used.

The inorganic oxide is preferably one or more selected from the group consisting of oxides of Al, Ti, V, Cr, Mn, Fe, Co, Ni, Y, Zr, Mo, Nb, La, Ce, Ta, and W and Li-containing oxides.

The coating layer may be a single layer or a combination of multiple layers.

In order to avoid that silicon in the composite particles reacts with carbon to generate silicon carbide, even in the case where heating is necessary at the time of coating, it is preferable to do so at lower than 800° C.

Note that, in order to produce such composite particles, in the method for producing composite particles described later, after producing the porous carbon filled with silicon, composite particles (S) and composite particles (L) (steps 1 and 2), it is necessary to carry out the above-described treatment on the composite particles (S) or the composite particles (L), or on both the composite particles (S) and the composite particles (L). In the case where the same coating is carried out on both the composite particles (S) and the composite particles (L), each of the composite particles (S) and the composite particles (L) may be coated and then mixed (step 3), or the coating may be done after mixing (step 3).

Examples of the effect of the coating layer include suppression of oxidation over time of silicon in the composite particles, increase in the initial coulombic efficiency, and improvement in the cycle characteristics, as described below.

When the composite particles are exposed to air or an oxygen-containing gas atmosphere, silicon is oxidized with the lapse of time. The presence of the coating layer on the surface of the composite particles can suppress air or an oxygen-containing gas from entering the inside of the composite particles.

Also, when an electrolytic solution decomposition product film (solid electrolyte interface <SEI> film) is formed on the surface of the composite particles or at lithium ion entry ports into the composite particles after lithium ions are first inserted into the composite particles in the lithium ion battery, lithium ions that cannot be deinserted from the closed pores in the composite particles are present, and thus the initial coulombic efficiency is reduced. Since the SEI film is present at the time of the second and subsequent lithium-ion insertions, the ratio of lithium ions trapped in the composite particles is greatly reduced. As described above, here, the presence of the coating layer on the surface of the composite particles prevents the insertion of lithium ions into the pores that are easily closed by the SEI film, thereby increasing the initial coulombic efficiency.

Also, when charging and discharging are repeated in the lithium-ion battery, it is considered that silicon in the composite particles reacts with fluorine, which is a component element of the electrolytic solution, and dissolves out as a silicon fluoride compound. When silicon dissolves out, the specific capacity of the composite particles is reduced. When the coating layer is present on the surface of the composite particles, the dissolution of the Si-containing compound is suppressed, the reduction in specific capacity of the composite particles is suppressed, and side reactions with the electrolytic solution is suppressed as well. In addition, the coating layer reduces resistance, which improves rate characteristics.

In the case where the present composite particles have a coating layer, they may have the same coating layer, but they may or may not have coating layers, or may have different types of coating layers depending on the particle diameter. For example, the following combinations are available.

(i) An aspect in which the small diameter composite particles have a coating layer and the large diameter composite particles do not have a coating layer.

(ii) An aspect in which the small diameter composite particles do not have a coating layer and the large diameter composite particles have a coating layer.

(iii) An aspect in which the small diameter composite particles and the large diameter composite particles have coating layers, but the types of the respective coating layers are different from each other.

The surface coating of the composite particles can be analyzed by performing analysis of the particle surface. Examples thereof include SEM-EDS, Auger electron spectroscopy, micro-infrared spectroscopy, and micro-Raman spectroscopy. Since the surface of the composite particles is analyzed, the spatial resolution of the analyzer is preferably ½ or less of the average particle diameter of the composite particles.

In the composite particles of one embodiment of the present invention, it is preferable that the small diameter composite particles have a coating layer since the small diameter composite particles have a high silicon content.

There is no restriction on the thickness of the coating layer as long as it does not impair battery performance, but when it is too thick, the quantitative silicon content rate in the composite particles decreases, and thus a thin layer is preferred and 0.1 to 30 nm is preferred.

The thickness of the coating layer can be measured by a transmission electron microscope or cross-sectional SEM. Alternatively, it may be the value calculated from the content rates of elements derived from the coating layer as quantified by elemental analysis of the composite particles and the sphere equivalent surface area determined from the above-described average cross-sectional diameter of the composite particles by SEM. The calculation method is described in detail. For example, when the coating is confirmed on the small diameter composite particles by SEM-EDS, calculation of the thickness of the coating on the small diameter composite particles is performed by the following method. From the average composition of the small diameter composite from the average Si concentration, carbon concentration, and oxygen concentration of the small diameter composite particles and the proportion of the small diameter composite particles in the composite particles, the mass concentration of the small diameter composite particles in the composite particles can be calculated. From the contents of elements derived from the coating layer quantified by elemental analysis of the composite particles and this mass concentration, the ratio between the small diameter composite particles and the coating component can be calculated. From the average cross-sectional diameter of the small diameter composite particles in the composite particles, their sphere equivalent surface area can be determined, and from the average composition of the small diameter composite particles, the average mass of the small diameter composite particles can also be calculated. From these values and the previously calculated ratio between the small diameter composite particles and the coating component, the mass of the elements derived from the coating layer present on the surface of the small diameter composite particles can be calculated. Using this value, the previously determined sphere equivalent surface area, and the density of the coating layer species, the thickness of the coating layer can be calculated. The density of the coating layer species used is selected from literature values as appropriate.

As for the composite particles of one embodiment of the present invention, when the small diameter composite particles are analyzed by SEM-EDS, it is preferable that one or more elements selected from Al, Ti, V, Cr, Mn, Fe, Co, Ni, Y, Zr, Mo, Nb, La, Ce, Ta, and W are detected.

Detection of the above-described elements from the small diameter composite particles means that there is a coating resulting from oxides of these elements on the surface of the small diameter composite particles. The presence of a coating layer resulting from oxides of one or more of these elements on the surface of the composite particles can improve cycle characteristics.

(2) Method for Producing Composite Particles

Although there is no particular restriction on the method for producing the composite particles of one embodiment of the present invention, examples thereof may include a production method including the following steps.

Step 1: a step of producing composite particles (S) by allowing a silane gas to act on porous carbon (S) having a $D_{V50}$ of 1.0 to 10.0 μm and a pore volume of 0.8 to 2.2 $cm^3/g$ to thereby fill in the pores of the porous carbon (S) with silicon.

Step 2: a step of producing composite particles (L) by allowing a silane gas to act on porous carbon (L) having a $D_{V50}$ greater than that of the porous carbon (S) and a pore volume of 0.2 to 0.8 $cm^3/g$ to thereby fill in the pores with silicon.

Step 3: a step of mixing the composite particles (S) and the composite particles (L) such that the proportion of the composite particles (S) is 5 to 50% by mass (the sum of the composite particles (S) and the composite particles (L) is 100% by mass).

(Step 1)

The $D_{V50}$ is the 50% particle diameter in the cumulative particle size distribution on a volume basis. It can be measured using a particle size analyzer with the laser diffraction method.

In step 1, a silane gas is allowed to act on porous carbon (S) having a $D_{V50}$ of 1.0 to 10.0 μm, such as 1.0 to 4.0 μm, and a pore volume of 0.8 to 2.2 $cm^3/g$. As a result, composite particles having a relatively small $D_{V50}$ and a relatively high silicon content rate can be obtained. For example, the above-described porous carbon (S) is allowed to stand still in a tube furnace, and the temperature is raised to 350° C. to 450° C. in an inert atmosphere such as argon or nitrogen gas. A temperature in this range allows silicon to be deposited only in the pores and on the surface of the porous carbon (S). Next, the gas is switched to a reaction gas containing silane ($SiH_4$). The concentration of silane in the reaction gas may be 100% by volume, but it can also be mixed with nitrogen gas or argon gas, for example, to achieve a concentration of 0.01 to 99.9% by volume for use. The pressure at the time of reaction may be normal pressure (101±10 kPaA). This allows silane gas to be adsorbed onto the pores in the porous carbon (S) and further thermally decomposed. As a result, silicon is deposited in the pores of the porous carbon (S). Silane gas is converted to silicon and hydrogen by the reaction shown in the following formula.

$$SiH_4 + Si \longrightarrow 2H_2$$

Therefore, by analyzing the composition in the exhaust gas and examining the concentration of silane and hydrogen, the endpoint of the reaction, that is, the time point at which silicon has filled the pores of the porous carbon (S) to the limit, can be determined. At this time, the silane gas can also be stopped before silicon has fully filled the pores of the porous carbon (S) to prepare a Si—C composite with a low silicon content rate.

After the reaction, the gas is switched from silane to an inert gas, but as a subsequent step, the porous carbon (S) may be exposed to the air or oxygen gas to generate an oxide film on the silicon surface at the time point where the temperature is lowered to 100 to 50° ° C. in the inert gas atmosphere. Alternatively, as another subsequent step, after thermal decomposition of the silane gas, the gas may be switched from silane to a hydrocarbon gas and a carbon film may be generated on the surface of the composite particles by CVD. These subsequent steps can be carried out alone or in combination. In the case where they are carried out in combination, either can be done first.

The Si—C composite obtained by step 1 is referred to as "composite particles (S)".

(Step 2)

In step 2, a silane gas is allowed to act on porous carbon (L) having a $D_{V50}$ greater than that of the porous carbon (S) and a pore volume of 0.2 to 0.8 $cm^3/g$. For example, in the case where the $D_{V50}$ of the porous carbon(S) is 4.0 μm or less, a porous carbon (L) having a $D_{V50}$ greater than 4.0 μm is used. As a result, composite particles having a relatively large $D_{V50}$ and a relatively low silicon content rate can be obtained. The conditions for the reaction are the same as in step 1, with the only difference being the porous carbon used as the raw material.

The Si—C composite obtained by step 2 is referred to as "composite particles (L)".

(Step 3)

This is a step of mixing the composite particles (S) and the composite particles (L) in appropriate proportions to thereby prepare the composite particles according to the present invention. Here, the composite particles (S) are added to make up 5 to 50% by mass in the entirety, with the remaining being the composite particles (L). That is, the proportion of the composite particles (S) in the total of the composite particles (S) and the composite particles (L) is 5 to 50% by mass, and the proportion of the composite particles (L) is 50 to 95% by mass.

The above-described "small diameter composite particles" is not necessarily composed entirely of the composite particles (S) alone. Also, the above-described "large diameter composite particles" is not necessarily composed entirely of the composite particles (L) alone. In order to produce the composite particles described in the above-described configuration example [1] of one embodiment of the present invention with the desired proportion of the small diameter composite particles, average cross-sectional diameter, average silicon content rates, (average silicon content rate of the large diameter composite particles (y))/(average silicon content rate of the small diameter composite particles (x)), and silicon content rate by quantitative analysis of the entire composite particles, it is necessary to analyze and elaborate the composite particles obtained by blending the composite particles (S) and the composite particles (L) by cross-sectional SEM-EDS while confirming that the desired ones have been obtained.

Note that, although the preparation and mixing of two types of composite particles having different $D_{V50}$ and silicon content rates are illustrated here, three or more types of composite particles can also be blended.

For the porous carbon (S) having a $D_{V50}$ of 1 to 10 μm and a pore volume of 0.8 to 2.2 $cm^3/g$ and the porous carbon (L) having a $D_{V50}$ greater than that of the porous carbon (S) and a pore volume of 0.2 to 0.8 $cm^3/g$, commercially available activated carbon or carbon molecular sieve may be purchased for use, or they may be synthesized by synthesizing polymers such as phenolic resin and melamine resin, subjecting them to thermal decomposition, and then activating them. The $D_{V50}$ can be adjusted by carrying out pulverization, sieving, or air flow classification as appropriate for purchased materials or for materials before, during, or after the production step of the porous carbon.

In the above, the boundary value of $D_{V50}$ between the composite particles (S) and the composite particles (L) is arbitrary and can be an arbitrary value between 1 and 10 μm, for example, 4 μm. For example, the $D_{V50}$ of the composite particles (S) may be 4 μm or less and the $D_{V50}$ of the composite particles (L) may be greater than 4 μm, or the $D_{V50}$ of the composite particles (S) may be 10 μm or less and the $D_{V50}$ of the composite particles (L) may be greater than 10 μm.

(3) Negative Electrode Material for Lithium-Ion Secondary Battery

The composite particles of one embodiment of the present invention can be widely used as an electrode material for a metal ion secondary battery, but in particular, they can be suitably used as a negative electrode material for a lithium-ion secondary battery. The composite particles may be used alone, but may also be used together with other negative electrode materials, for example, for the purpose of adjusting the battery capacity or for the purpose of absorbing the volume changes caused by expansion and contraction of the composite particles. As the other negative electrode materials, those generally used in a lithium-ion secondary battery can be used. In the case where other negative electrode materials are used, the composite particles and other negative electrode materials are usually mixed for use.

Examples of other negative electrode materials include graphite, hard carbon, soft carbon, lithium titanate ($Li_4Ti_5O_{12}$), alloy-based active materials such as silicon and tin, and composite materials thereof. These negative electrode materials are usually in the form of particles. The negative electrode materials other than the composite particles may be used alone or in combination of two or more kinds thereof. Among them, graphite and hard carbon are particularly preferably used. For the negative electrode material of the present invention, a form containing the composite particles and graphite particles is one of the suitable forms from the point of adjusting the capacity and the point of reducing the volume changes of the entire negative electrode mixture layer. In the case where multiple types of materials are used as the negative electrode material, the materials may be mixed in advance for use, or may be sequentially added when a slurry for forming a negative electrode mixture, which will be described later, is prepared.

As an apparatus for mixing the composite particles and other materials, a commercially available mixer or stirrer can be used. Specific examples thereof include mixers such as a mortar, a ribbon mixer, a V-type mixer, a W-type mixer, a one blade mixer, and a Nauta mixer.

(4) Negative Electrode Mixture Layer

A negative electrode mixture layer of one embodiment of the present invention contains the above-described negative electrode material. That is, the negative electrode mixture layer of one embodiment of the present invention contains the present composite particles. The negative electrode mixture layer of one embodiment of the present invention can be used as a negative electrode mixture layer for a lithium-ion secondary battery. The negative electrode mixture layer generally contains a negative electrode material, a binder, and a conductive assistant as an optional component.

As the method for producing the negative electrode mixture layer, a known method as will be described below can be used, for example. A negative electrode material, a binder, a conductive assistant as an optional component, and a solvent are used to prepare a slurry for forming a negative electrode mixture layer. The slurry is applied to a current collector such as copper foil and dried. By further vacuum drying this, the solvent is removed. The obtained product may be referred to as a negative electrode sheet. The negative electrode sheet is composed of a negative electrode mixture layer and the current collector. The negative electrode sheet is cut or punched out into a desired shape and size, and then pressed to improve the density of the electrode mixture layer (sometimes referred to as electrode density). Increasing the electrode density improves the energy density of the battery. The electrode density varies depending on the components of the electrode mixture layer, but is 1.1 to 1.9 $g/cm^3$. The pressing method is not particularly limited as long as the electrode can be processed to have the desired electrode density, and examples thereof include uniaxial-pressing and roll-pressing. Here, the step of carrying out the pressing after the shape processing is illustrated, but the shape processing may be carried out after the pressing. The object in this state is referred to as the negative electrode in the present invention. The negative electrode also includes a current collector with a current collector tab attached, as necessary.

Any binder generally used in the negative electrode mixture layer of a lithium-ion secondary battery can be freely selected for use as the binder. Examples thereof include polyethylene, polypropylene, ethylene-propylene terpolymer, butadiene rubber, styrene-butadiene rubber, butyl rubber, acrylic rubber, polyvinylidene fluoride, polytetrafluoroethylene, polyethylene oxide, polyepichlorohydrin, polyphosphazene, polyacrylonitrile, carboxymethyl cellulose and salts thereof, polyacrylic acid, and polyacrylamide. The binder may be used alone or in combination of two or more kinds thereof. The amount of the binder is preferably 0.5 to 30 parts by mass based on 100 parts by mass of the negative electrode material.

The conductive conductive assistant is not particularly limited as long as the conductive assistant agent plays a role in imparting conductivity and dimensional stability (action of absorbing volume changes of the composite particles at the time of insertion and deinsertion of lithium) to the electrode. Examples thereof include carbon nanotubes, carbon nanofibers, vapor grown carbon fibers (for example, "VGCF®—H" manufactured by Showa Denko K.K.), conductive carbon black (for example, "DENKA BLACK®" manufactured by Denka Company Limited, "Super C65" manufactured by Imerys Graphite & Carbon, and "Super C45" manufactured by Imerys Graphite & Carbon), and conductive graphite (for example, "KS6L" manufactured by Imerys Graphite & Carbon and "SFG6L" manufactured by Imerys Graphite & Carbon). Also, two or more of the above-described conductive assistants can be used.

The conductive assistant preferably contains carbon nanotubes, carbon nanofibers, and vapor grown carbon fibers, and the fiber length of these conductive assistants is preferably ½ or more of the $D_{v50}$ of the composite particles. With this fiber length, these conductive assistants bridge between the negative electrode active materials containing the composite particles, and the cycle characteristics can be improved. When single-wall type or multi-wall type carbon nanotubes or carbon nanofibers having a fiber diameter of 15 nm or less are used, the number of bridges is further increased with the same amount of carbon nanotubes or carbon nanofibers added as compared to the case where thicker ones are used. In addition, since they are more flexible, they are more preferred from the viewpoint of improving the electrode density.

The amount of the conductive assistant is preferably 1 to 30 parts by mass with respect to 100 parts by mass of the negative electrode material.

There is no particular restriction on the solvent for preparing the slurry for electrode coating, and examples thereof include N-methyl-2-pyrrolidone, dimethylformamide, isopropanol, and water. In the case of a binder using water as a solvent, a thickening agent is preferably used in combination. The amount of the solvent is adjusted such that the slurry has a viscosity that makes it easy to be applied onto a current collector.

(5) Lithium-Ion Secondary Battery

A lithium-ion secondary battery according to the present invention contains the negative electrode mixture layer. The lithium-ion secondary battery usually contains a negative electrode containing the negative electrode mixture layer and a current collector, a positive electrode containing a positive electrode mixture layer and a current collector, at least one of a nonaqueous electrolytic solution and a nonaqueous polymer electrolyte present therebetween, a separator, and a battery case accommodating these components. As long as the lithium-ion secondary battery contains the negative electrode mixture layer, other configurations including conventionally known configurations can be employed without particular restriction.

The positive electrode mixture layer usually contains a positive electrode material, a conductive assistant, and a binder. The positive electrode in the lithium-ion secondary battery may have a general configuration in a typical lithium-ion secondary battery.

The positive electrode material is not particularly restricted as long as electrochemical lithium insertion and deinsertion can be repeated and the oxidation-reduction potential of these reactions is sufficiently higher than the oxidation-reduction potential of the negative electrode reaction. For example, $LiCoO_2$, $LiNiO_2$, $LiMn_2O_4$, $LiCo_{1/3}Mn_{1/3}Ni_{1/3}O_2$, carbon-coated $LiFePO_4$, or a mixture thereof can be suitably used.

As the conductive assistant, the binder, and the solvent for preparing the slurry, those described in the section of the negative electrode can be used. Aluminum foil is suitably used as the current collector.

The nonaqueous electrolytic solution and nonaqueous polymer electrolyte used in the lithium-ion battery can be those known for lithium-ion secondary batteries. For example, those in which lithium salts such as $LiClO_4$, $LiPF_6$, $LiAsF_6$, $LiBF_4$, $LiSO_3CF_3$, and $CH_3SO_3Li$ are dissolved in the following solvents are used as the nonaqueous electrolytic solution. Examples of the solvent include a nonaqueous solvent such as ethylene carbonate, diethyl carbonate, dimethyl carbonate, ethyl methyl carbonate, propylene carbonate, butylene carbonate, acetonitrile, propionitrile, dimethoxyethane, tetrahydrofuran, and γ-butyrolactone.

Examples of the nonaqueous polymer electrolyte include a gel polymer electrolyte containing, for example, polyethylene oxide, polyacrylonitrile, polyvinylidene fluoride, and polymethyl methacrylate; and a solid polymer electrolyte containing, for example, a polymer having an ethylene oxide bond.

Also, a small amount of the additive used in the electrolytic solution of a general lithium-ion battery may be added to the nonaqueous electrolytic solution. Examples of the substance include vinylene carbonate (VC), biphenyl, propanesultone (PS), fluoroethylene carbonate (FEC), and ethylene sultone (ES). Preferred examples thereof include VC and FEC. The amount to be added is preferably 0.01 to 20% by mass with respect to 100% by mass of the nonaqueous electrolytic solution.

The separator can be freely selected from materials that can be used in a general lithium-ion secondary battery, including combinations thereof, and examples thereof include a microporous film made of polyethylene or polypropylene. In addition, it is also possible to use separators obtained by mixing particles such as $SiO_2$ or $Al_2O_3$ as fillers into such separators, or separators obtained by adhering the particles to the surfaces of such separators.

The battery case is not particularly restricted as long as it can accommodate the positive electrode, the negative electrode, the separator, and the electrolytic solution. In addition to those standardized in the industry such as commercially available battery packs, 18650 cylindrical cell, and coin-shaped cells, the battery case, including those packed with aluminum packaging material, for example, can be freely designed and used.

The electrodes may be stacked and packed for use. The single cells can be connected in series and used as batteries or modules.

The lithium-ion secondary battery according to the present invention can be used as a power source for electronic devices such as smartphones, tablet PCs, and mobile information terminals; a power source for electric motors such as electric tools, vacuum cleaners, electric bicycles, drones, and electric vehicles; and storage of electric power obtained by, for example, fuel cells, solar power generation, and wind power generation.

EXAMPLES

Hereinafter, one embodiment of the present invention will be specifically described by means of Examples. Note that the following Examples are not intended to limit the present invention.

Methods for evaluating composite particles, methods for producing batteries, methods for measuring characteristics of batteries, and raw materials used in Examples and Comparative Examples are as follows.

<1> Evaluation of Porous Carbon and Composite Particles ($D_{V50}$, Particle Size Distribution Measurement)

Using LMS-2000e manufactured by Seishin Enterprise Co., Ltd. as a laser diffraction particle size distribution measurement apparatus, 5 mg of a sample was placed in a vessel, 10 g of water containing 0.04% by mass of a surfactant was added thereto, and after performing ultrasonic treatment for 5 minutes, the measurement was carried out, and the 50% particle diameter ($D_{V50}$) in the volume-based cumulative particle size distribution of the porous carbon and the composite particles were determined.

(Pore Volume, Nitrogen Adsorption Test)

A nitrogen adsorption test was carried out under the following conditions to determine the pore volume.

A sample was placed in a sample cell (9 mm×135 mm) such that the total surface area of the sample was 2 to 60 $m^2$, dried at 300° C. under vacuum conditions for 1 hour, and then the sample weight was measured, and the measurement was carried out by the following method.

Apparatus: NOVA 4200e® manufactured by Quantachrome Instruments

Measurement gas: nitrogen

Relative pressure setting value in measurement range: 0.005 to 0.995

The pore volume was determined by calculating the adsorption amount at a relative pressure of 0.99 by linear approximation from adsorption isotherm data at two points back and forth of a relative pressure of 0.99. At this time, the calculation was performed with a nitrogen liquid density of 0.808 $g/cm^3$, a volume of 1 mol of nitrogen in the standard state of 22.4133 L, and a nitrogen atomic weight of 14.0067.

(Cross-Sectional Diameter and Average Silicon Content Rate of Composite Particles, Cross-Sectional SEM-EDS)

Sampling was performed with a small spatula from well-mixed powder of composite particles, the sample was loaded on carbon tape, and in the case of particle observation, observation was performed as is. In the case of cross-sectional observation, the sample whose cross-section was processed using CROSS SECTION POLISHER® manufactured by JEOL Ltd. was observed. The observation and measurement were carried out by the following method.

SEM: scanning electron microscope: Regulus® 8220 (manufactured by Hitachi High-Tech Science Corporation)

EDS: Xflash® 5060 FlatQUAD (manufactured by Bruker Corporation)

Acceleration voltage: 1 to 20 kV

Observation magnification: 500 to 5,000 times (selected as appropriate according to the size of particles)

(Particle Diameter)

The particle diameter was determined by measuring the length from the cross-sectional SEM image. In the case of spherical particles, the maximum diameter was taken as the particle diameter. In the case of non-spherical particles, the equivalent circle diameter was calculated from the cross-sectional area and taken as the particle diameter.

Calculation of the cross-sectional area was carried out with image analysis software (ImageJ). The method for measuring the cross-sectional diameter and the method of classification into small diameter composite particles and large diameter composite particles are as described in the section of Description of Embodiments.

(Si and C (Carbon) Content Rates by EDS)

Using EDS (XFlash® 5060 FlatQUAD), Si and C in the central part of each particle of the cross-sectional sample were analyzed at an acceleration voltage of 5 kV, and the Si content rate (% by mass) and the C content rate (% by mass) were calculated based on their respective proportions. The method for determining the average silicon (Si) content rate is as described in the section of Description of Embodiments.

(Metal Components)

EDS (XFlash® 6-60, manufactured by Bruker Corporation) was used to analyze the metal components on the surface of the particle sample at an acceleration voltage of 20 kV.

(Silicon Content Rate for Entire Composite Particles, XRF)

A sample cup was filled with a sample, the measurement was carried out by the following method, and the silicon content rate (content rate of Si element) was calculated in % by mass using the fundamental parameter method (FP method).

X-ray fluorescence apparatus: NEX CG manufactured by Rigaku Corporation

Tube voltage: 50 kV

Tube current: 1.00 mA

Sample cup: Φ32, 12 mL, CH1530

Sample weight: 2 to 4 g

Sample height: 5 to 18 mm

Note that the FP method was performed using the analysis software attached to the apparatus.

(Oxygen Content Rate)

About 20 mg of a sample was weighed into a nickel capsule, and measurement of the oxygen content rate was carried out by the following method.

Apparatus: Oxygen/nitrogen analyzer EMGA-920 manufactured by HORIBA, Ltd.

Carrier gas: Argon (Raman Spectroscopy)

A sample was placed on a glass slide using a small spatula and uniformly spread such that the underlying glass slide was not exposed. The range over which the sample was spread was made wider than the measurement range described below. This is to ensure that only the composite particles were laid down within the measurement range. This sample was measured by the following method.

Microscopic Raman spectroscopic measuring apparatus: LabRAM HR Evolution manufactured by HORIBA, Ltd.

Excitation wavelength: 532 nm

Exposure time: 10 seconds

Integration: 2 times

Diffraction gratings: 300/mm (600 nm)

Measurement range: length 60 μm×width 60 μm

Number of points: 30 points were measured with a vertical feed of 12.0 μm and a horizontal feed of 15.0 μm, and a spectrum determined by averaging them was obtained. The Si peak at 450 to 495 $cm^{-1}$ in the Raman spectrum was observed and the peak value was recorded.

($I_{SiC111}/I_{Si111}$, powder XRD measurement)

The sample was filled in a glass sample plate (window length and width: 18 mm×20 mm, depth: 0.2 mm), and powder XRD measurement was carried out by the following method.

XRD apparatus: SmartLab® manufactured by Rigaku Corporation

X-ray source: Cu-Kα radiation

Kβ line removal method: Ni filter

X-ray output: 45 kV, 200 mA

Measurement range: 10.0 to 80.0°

Scan speed: 10.0°/min

The obtained XRD pattern was subjected to background removal, removal of Kα2 component, and smoothing using analysis software (PDXL2, manufactured by Rigaku Corporation), and then subjected to profile fitting to determine the peak position, height (intensity), and full width at half maximum.

From the peak analysis results, (peak height of SiC111 plane)/(peak height of Si111 plane) was calculated. Note that, for the Si111 plane, the diffraction peak around 2θ=28° was used, and for the SiC111 plane, the diffraction peak around 2θ=35° was used.

(Compression Density of Powder)

Apparatus: Tensilon universal material testing instrument (manufactured by A&D Company, Limited)

About 0.3 g of composite particles were weighed, placed in a die having a Diameter of 7 mm, covered with a top lid, and molded under pressure of 196 MPa using the above-described apparatus. From the composite particle weight, displacement, and die shape, the compression density was calculated. Note that the displacement was measured by applying pressure under the same conditions without filling the die with the composite sample in advance, and this was used as the deformation of the die itself to correct the displacement at the time of the compression test of the powder.

<2> Cell for Testing (Preparation of Negative Electrode Material)

A negative electrode material was obtained by mixing the composite particles and graphite particles such that the silicon content rate in the total amount of the negative electrode material was 5.7% by mass. As the graphite particles, artificial graphite having a $D_{V50}$ of 14 μm, an initial discharge specific capacity of 360 mAh/g, and an initial coulombic efficiency of 92% was used.

[2-1] Production of Negative Electrode Sheet

Styrene butadiene rubber (SBR) and carboxymethyl cellulose (CMC) were used as binders. Specifically, a SBR aqueous dispersion having a solid content rate of 40% by mass, in which SBR fine particles were dispersed, and a 2% by mass CMC aqueous solution in which CMC powder was dissolved were used.

A mixture of carbon black (SUPER C45, manufactured by Imerys Graphite & Carbon) and vapor grown carbon fibers (VGCF®—H, manufactured by Showa Denko K.K.) at a mass ratio of 3:2 was prepared as a mixed conductive assistant.

A slurry for forming a negative electrode mixture layer was obtained by mixing a negative electrode material, a mixed conductive assistant, a CMC aqueous solution, and a SBR aqueous dispersion such that the negative electrode material (mixture of composite particles and artificial graphite) produced in Examples and Comparative Examples described below was 90 parts by mass, the mixed conductive assistant was 5 parts by mass, the CMC solid content rate was 2.5 parts by mass, and the SBR solid content rate was 2.5 parts by mass; adding an appropriate amount of water for viscosity adjustment; and kneading the mixture with a rotation/revolution mixer (manufactured by THINKY CORPORATION). The slurry concentration was 45 to 55% by mass.

The slurry for forming a negative electrode mixture layer was uniformly applied onto a copper foil having a thickness of 20 μm as a current collector foil using a doctor blade having a gap of 150 μm, dried on a hot plate, and then vacuum-dried at 70° C. for 12 hours to form a negative electrode mixture layer on the current collector foil. This is referred to as a negative electrode sheet (sheet composed of the negative electrode mixture layer and the current collector foil).

[2-2] Production of Coin Cell (Lithium Counter Electrode Cell)

The negative electrode sheet was punched out into 16 mmφ and pressed by a uniaxial pressing machine to adjust the density of the negative electrode mixture layer to 1.4 $g/cm^3$, thereby obtaining a negative electrode.

The electrode density of the negative electrode (negative electrode density) was calculated as follows. The mass and the thickness of the negative electrode obtained by the above-described method were measured. From them, the mass and the thickness of the current collector foil punched out into 16 mmφ, which were separately measured, were subtracted to determine the mass and the thickness of the negative electrode mixture layer, and from these values, the electrode density (negative electrode density) was calculated.

In an insulating gasket made of polypropylene (inside diameter: about 18 mm), a separator (polypropylene microporous film) impregnated with an electrolytic solution was sandwiched by the above-described negative electrode and metal lithium foil with a thickness of 1.7 mm punched out into 17.5 mmφ, and laminated. At this time, the negative electrode mixture layer surface was laminated so as to face the metal lithium foil with the separator sandwiched therebetween. This was placed in a 2320 coin-shaped cell and sealed with a caulking machine to obtain a cell for testing (lithium counter electrode cell).

Note that the electrolytic solution in the lithium counter electrode cell was a solution obtained by mixing 1 part by mass of vinylene carbonate (VC) and 10 parts by mass of fluoroethylene carbonate (FEC) in 100 parts by mass of a solvent in which ethylene carbonate, ethyl methyl carbonate, and diethyl carbonate were mixed at a volume ratio of 3:5:2, and the electrolyte lithium hexafluorophosphate ($LiPF_6$) was further dissolved therein to a concentration of 1 mol/L.

[2-3] Initial Charge Specific Capacity, Initial Discharge Specific Capacity

A test was carried out using the lithium counter electrode cell. Constant current (CC) charging was carried out from open circuit voltage (OCV) to 0.005 V at a current value corresponding to 0.1 C. At the time point where 0.005 V was reached, the charging was switched to constant voltage (CV) charging. The cutoff condition was set to the time point when the current value was decreased to the value corresponding to 0.005 C. The specific capacity at this time was taken as the initial charge specific capacity. Next, constant current discharging was carried out at a current value corresponding to 0.1 C with an upper limit voltage of 1.5 V. The specific capacity at this time was taken as the initial discharge specific capacity.

The test was carried out in a thermostatic tank set at 25° C. At this time, the specific capacity is a value obtained by dividing the capacity by the mass of the negative electrode active material. Also, in the present test, the "current value corresponding to 1 C" is the size of current that can finish discharging the capacity of the negative electrode estimated from the mass of Si and carbon (including graphite) in the negative electrode active material contained in the negative electrode and the theoretical specific capacity (4200 mAh/g and 372 mAh/g, respectively) in 1 hour.

[2-4] Initial Coulombic Efficiency

The initial coulombic efficiency (%) was defined as (initial discharge specific capacity)/(initial charge specific capacity)×100, which is a numerical value expressed as a percentage of the value obtained by dividing the initial discharge specific capacity by the initial charge specific capacity.

<3> Three Electrode Laminate Half Cell

[3-1] Production of Three Electrode Laminate Half Cell

The negative electrode sheet obtained in [2-1] was adjusted using a roll press such that the density of the negative electrode mixture layer was 1.3 to 1.6 g/$cm^3$, and was punched out such that the area of the negative electrode mixture layer-coated portion was 4.0 $cm^2$ (2.0 cm×2.0 cm), and the area of the negative electrode mixture layer-uncoated portion (tab portion) is 0.5 $cm^2$, to thereby make a working electrode (negative electrode piece for a working electrode).

The Li roll was cut out to obtain a Li piece for a counter electrode having an area of 7.5 $cm^2$ (3.0 cm×2.5 cm) and a Li piece for a reference electrode having an area of 3.75 $cm^2$ (1.5 cm×2.5 cm). A Ni tab having a width of 5 mm was prepared for a counter electrode and a reference electrode, respectively, and a Ni mesh having a size of 5 mm×20 mm was fixed to overlap the 5 mm portion on the tip of the Ni tab. At this time, the 5 mm width of the Ni tab and the 5 mm width of the Ni mesh were aligned and fixed. A Ni tab for the working electrode was also fixed to the Cu foil tab portion of the negative electrode piece for the working electrode. The Ni mesh at the tip of the Ni tab for the counter electrode was attached to the corner of the Li piece so as to be vertical to the 3.0 cm side of the Li piece for the counter electrode. The Ni mesh at the tip of the Ni tab for the reference electrode was attached to the center of the 1.5 cm side of the Li piece so as to be vertical to the 1.5 cm side of the Li piece for the reference electrode. A microporous polypropylene film was sandwiched between the working electrode and the counter electrode, and the reference electrode was brought into liquid contact nearby the working electrode with the microporous polypropylene film in-between such that short circuit does not occur. In this state, the resultant was sandwiched with two rectangular aluminum laminate packaging materials with the tips of all Ni tabs protruding outward, and the three sides were heat fused together. An electrolytic solution was injected thereinto from the opening. Then, the opening was sealed by heat fusion to produce a three electrode laminate half cell for evaluation.

The electrolytic solution used was the same as that used in [2-2] described above.

[3-2] Determination of C Rate

The C rate of each cell was calculated from the initial discharge specific capacity calculated in [2-3] and the amount of the active material on the negative electrode.

[3-3] Charge/Discharge Cycle Test Using Three Electrode Laminate Half Cell

The three electrode laminate half cell obtained in [3-1] was set in a charge/discharge device, and aging was carried out for 6 cycles under the following conditions. In the first cycle of the aging, constant current (CC) charging was carried out at 0.05 C from a rest potential to 0.005 V vs. Li/$Li^+$. The discharging was carried out at a constant current (CC) of 0.05 C to 1.5 V vs. Li/$Li^+$. In the second to sixth cycle of the aging, after performing charging at a constant current (CC) of 0.2 C to 0.005 V vs. Li/$Li^+$, and at the time point where 0.005 V vs. Li/$Li^+$ was reached, the charging was switched to constant voltage (CV) charging with a cut-off current value of 0.025 C. The discharging was carried out at a constant current (CC) of 0.2 C to 1.5 V vs. Li/$Li^+$.

After carrying out the aging, a charge/discharge cycle test was carried out by the following method.

The charging was carried out at a constant current (CC) of 1 C to 0.005 V vs. Li/$Li^+$, and the charging was then switched to constant voltage (CV) charging with a cut-off current value of 0.025 C. The discharging was carried out at a constant current (CC) of 1 C to 1.5 V vs. Li/$Li^+$.

The charging and discharging operations were carried out for 20 cycles when the charging and discharging operations were defined as 1 cycle, and a low rate test was carried out in the 21st cycle in which the charge/discharge rate was changed to 0.1 C. The discharge capacity in the 50th cycle after the start of the test at 1 C was defined as the Li deinsertion capacity in the 50th cycle.

A discharge (Li deinsertion) capacity retention rate in the 50th cycle defined by the following equation was calculated.

$$\text{Discharge (Li deinsertion) capacity retention rate in 50th cycle (\%)} = \{(\text{Li deinsertion) capacity in 50th cycle after 1 C test start})/(\text{Li deinsertion capacity in first cycle after 1 C test start})\}\times 100$$

(Porous Carbon)

As the porous carbon, the following materials were used.

Porous carbon S1 ($D_{V50}$=1.6 μm, pore volume=1.10 $cm^3$/g)

Porous carbon S2 ($D_{V50}$=4.4 μm, pore volume=1.10 $cm^3$/g)

Porous carbon L1 ($D_{V50}$=19.8 μm, pore volume=0.70 $cm^3$/g)

Porous carbon L2 ($D_{V50}$=9.5 μm, pore volume=0.66 $cm^3$/g)

Porous carbon C1 ($D_{V50}$=6.5 μm, pore volume=0.63 $cm^3$/g)

Porous carbon C2 ($D_{V50}$=6.5 μm, pore volume=0.80 $cm^3$/g)

(Synthesis of Composite Particles (S1): Used in Examples 1, 2, 4, 5, and 7)

1.9 g of the porous carbon S1 was charged into a tubular furnace, and the temperature was raised while flowing argon gas at 1 L/min. When the temperature reached constant at 400° C., the gas was switched to silane gas of 100% by volume at 65 mL/min. The pressure in the furnace at the time of the reaction was 101 kPaA. After 1.9 hours, the gas was switched from silane gas to argon gas and the temperature was decreased. As a result, composite particles (S1) were obtained.

(Synthesis of Composite Particles (S2): Used in Example 3)

1.7 g of the porous carbon S2 was charged into a tubular furnace and the temperature was raised while flowing argon gas at 1 L/min. When the temperature became constant at 400° C., the gas was switched to silane gas of 100% by volume at 65 mL/min. The pressure inside the furnace at the time of the reaction was 101 kPaA. After 1.9 hours, the gas was switched from silane gas to argon gas, and the temperature was decreased. As a result, composite particles (S2) were obtained.

(Synthesis of Composite Particles (L1): Used in Examples 1, 3, 4, 5, and 9)

12.9 g of the porous carbon L1 was charged into a tubular furnace and the temperature was raised while flowing argon gas at 1 L/min. When the temperature was constant at 400° C., the gas was switched to silane gas of 100% by volume at 65 mL/min. The pressure in the furnace during the reaction was 101 kPaA. After 2.6 hours, the gas was switched from silane gas to argon gas, and the temperature was decreased. As a result, composite particles (L1) were obtained.

(Synthesis of composite particles (L2): used in Examples 2 and 6)

20 g of the porous carbon L2 was charged into a tubular furnace and the temperature was raised while flowing argon gas at 1 L/min. When the temperature was constant at 400° C., the gas was switched to silane gas of 100% by volume at 130 mL/min. The pressure inside the furnace during the reaction was 101 kPaA. After 2 hours, the gas was switched from silane gas to argon gas, and the temperature was decreased. As a result, composite particles (L2) were obtained.

(Synthesis of Composite Particles Having Coating Layer)

(Synthesis of Composite Particles (S3): Used in Examples 6 and 8)

The composite particles (S1) were fed into a barrel sputtering apparatus (manufactured by Toshima Manufacturing Co., Ltd.), and $Y_2O_3$ was deposited on the particle surface under the following conditions to thereby obtain composite particles (S3).

Sputtering conditions

Target: $Y_2O_3$

Target density: 4.81

Film formation processing speed: 0.84 nm/h

Film formation processing time: 3 h (Synthesis of Composite Particles (L3): Used in Examples 7 and 8)

The composite particles (L1) were fed into a barrel sputtering apparatus (manufactured by Toshima Manufacturing Co., Ltd.), and $Nb_2O_5$ was deposited on the particle surface under the following conditions to thereby obtain composite particles (L3).

Sputtering conditions

Target: $Nb_2O_5$

Target density: 4.52

Film formation processing speed: 0.21 nm/h

Film formation processing time: 14 h (Synthesis of Composite Particles (S4): Used in Example 9)

1.9 g of the porous carbon S1 was charged into a tubular furnace and the temperature was raised while flowing argon gas at 1 L/min. When the temperature reached constant at 400° C., the gas was switched to silane gas of 100% by volume at 65 mL/min. The pressure in the furnace at the time of the reaction was 101 kPaA. After 1.8 hours, the gas was switched from silane gas to argon gas and held for 1 hour. The argon gas was switched to argon dilution gas of 20% acetylene, and the temperature was raised to 650° C. After holding at 650° C. for 30 minutes, the argon dilution gas of 20% acetylene was switched to argon gas, and the temperature was decreased. As a result, composite particles (S4) were obtained.

(Synthesis of Composite Particles (C1): Used in Comparative Example 1)

5.0 g of the porous carbon C1 was charged into a tubular furnace, and the temperature was raised while flowing argon gas at 1 L/min. When the temperature reached constant at 400° C., the gas was switched to argon dilution silane gas of 17.4% by volume at 230 mL/min. The pressure in the furnace at the time of the reaction was 101 kPaA. After 2 hours, the gas was switched from silane gas to argon gas and the temperature was decreased. As a result, composite particles (C1) were obtained.

(Synthesis of Composite Particles (C2): Used in Comparative Example 2)

4.1 g of the porous carbon C2 was charged into a tubular furnace, and the temperature was raised while flowing argon gas at 1 L/min. When the temperature reached constant at 400° C., the gas was switched to argon dilution silane gas of 17.4% by volume at 230 mL/min. The pressure in the furnace at the time of the reaction was 101 kPaA. After 3.25 hours, the gas was switched from silane gas to argon gas and the temperature was decreased. As a result, composite particles (C2) were obtained.

Examples 1 to 9

As composite particles, the composite particles (S) and the composite particles (L) were uniformly mixed using a mortar so as to obtain the composition of the composite particles listed in Table 1, and composite particles 1 to 9 were obtained. For the composite particles 1 to 9, the evaluation described above was carried out. The evaluation results are shown in Table 1.

Comparative Examples 1 to 3

The evaluation described above was carried out using, as composite particles, only the composite particles (C1) for Comparative Example 1, only the composite particles (C2) for Comparative Example 2, and only the composite particles (L1) for Comparative Example 3. The evaluation results are shown in Table 1.

TABLE 1

| | | Composition of composite particles | | | | |
|---|---|---|---|---|---|---|
| | Composite particles | Composite particles (S) | Coating: composite particle (S) surface | Composite particles (L) | Coating: composite particle (L) surface | Proportion of composite particles (S) mixed (%) |
| Example 1 | Composite particles 1 | (S1) | — | (L1) | — | 25 |
| Example 2 | Composite particles 2 | (S1) | — | (L2) | — | 22 |
| Example 3 | Composite particles 3 | (S2) | — | (L1) | — | 30 |
| Example 4 | Composite particles 4 | (S1) | — | (L1) | — | 40 |
| Example 5 | Composite particles 5 | (S1) | — | (L1) | — | 30 |
| Example 6 | Composite particles 6 | (S3) | $Y_2O_3$ | (L2) | — | 25 |

TABLE 1-continued

| | Composite particles | Composition of composite particles: Composite particles (S) | Coating: composite particle (S) surface | Composite particles (L) | Coating: composite particle (L) surface | Proportion of composite particles (S) mixed (%) |
|---|---|---|---|---|---|---|
| Example 7 | Composite particles 7 | (S1) | — | (L3) | $Nb_2O_5$ | 25 |
| Example 8 | Composite particles 8 | (S3) | $Y_2O_3$ | (L3) | $Nb_2O_5$ | 25 |
| Example 9 | Composite particles 9 | (S4) | Carbon | (L1) | — | 30 |
| Comparative Example 1 | | Composite particles (C1) only | | | | |
| Comparative Example 2 | | Composite particles (C2) only | | | | |
| Comparative Example 3 | | Composite particles (L1) only | | | | |

TABLE 1

(continued)

| | Physical properties of composite particles: Si content rate (% by mass) | O content rate (% by mass) | O content rate/Si content rate | Si peak ($cm^{-1}$) | $(ISiC_{111})/(ISi_{111})$ | Pore volume ($cm^3/g$) | Average particle diameter (μm) | Proportion of small diameter composite particles (%) |
|---|---|---|---|---|---|---|---|---|
| Example 1 | 49 | 3 | 0.061 | 469 | 0 | 0.05 | 9.8 | 29 |
| Example 2 | 48 | 3 | 0.063 | 470 | 0 | 0.05 | 4.5 | 23 |
| Example 3 | 51 | 3 | 0.059 | 468 | 0 | 0.05 | 10.0 | 31 |
| Example 4 | 53 | 3 | 0.057 | 469 | 0 | 0.05 | 8.0 | 38 |
| Example 5 | 51 | 3 | 0.059 | 469 | 0 | 0.05 | 3.2 | 29 |
| Example 6 | 48 | 5 | 0.104 | 469 | 0 | 0.05 | 10.1 | 29 |
| Example 7 | 48 | 4 | 0.083 | 469 | 0 | 0.05 | 9.9 | 29 |
| Example 8 | 47 | 5 | 0.106 | 469 | 0 | 0.05 | 10.3 | 29 |
| Example 9 | 50 | 1 | 0.020 | 469 | 0 | 0.03 | 9.7 | 28 |
| Comparative Example 1 | 40 | 6 | 0.150 | 470 | 0 | 0.05 | 5.6 | 3 |
| Comparative Example 2 | 50 | 1 | 0.020 | 469 | 0 | 0.05 | 5.6 | 3 |
| Comparative Example 3 | 42 | 3 | 0.071 | 468 | 0 | 0.05 | 12.7 | 13 |

| | Physical properties of composite particles: Average Si concentration of small diameter composite particles (% by mass) (x) | Average Si concentration of large diameter composite particles (% by mass) (y) | (y)/(x) | Evaluation of composite particles: Powder compression density ($cm^3/g$) | Capacity retention rate (%) |
|---|---|---|---|---|---|
| Example 1 | 53.4 | 44.9 | 0.84 | 1.23 | 84 |
| Example 2 | 54.3 | 44.0 | 0.81 | 1.25 | 89 |
| Example 3 | 59.3 | 44.7 | 0.75 | 1.23 | 85 |
| Example 4 | 54.8 | 44.2 | 0.81 | 1.30 | 80 |
| Example 5 | 54.9 | 44.2 | 0.81 | 1.27 | 82 |
| Example 6 | 53.2 | 44.1 | 0.83 | 1.22 | 86 |
| Example 7 | 53.8 | 44.5 | 0.83 | 1.23 | 85 |
| Example 8 | 53.1 | 44.7 | 0.84 | 1.22 | 87 |
| Example 9 | 53.3 | 43.7 | 0.82 | 1.25 | 86 |
| Comparative Example 1 | 45.0 | 45.3 | 1.01 | 1.15 | 90 |
| Comparative Example 2 | 54.8 | 54.8 | 1.00 | 1.15 | 73 |
| Comparative Example 3 | 44.5 | 44.4 | 1.00 | 1.12 | 82 |

From Examples 1 to 9, it can be seen that the composite particles that satisfy the requirements of the above-described configuration example [1] of one embodiment of the present invention, that is, composite particles in which the proportion of the number of the small diameter composite particles in the number of the composite particles measured in cross-sectional SEM-EDS is 5 to 45%, the value of (average silicon content rate of the large diameter composite particles (y))/(average silicon content rate of the small diameter composite particles (x)) is 0.90 or less, and the silicon content rate of the entire composite particles by XRF is 45% by mass or more, have both a powder compression density of 1.20 $g/cm^3$ or more and a capacity retention rate of 80% or more.

In addition, from Examples 6 to 8, it can be seen that coating the composite particles with metal oxides improves the capacity retention rate in the cycle test of the three electrode laminate half cell compared to the cases with no coating. This is because the coating can suppress side reactions.

From Example 9, it can be seen that coating the composite particles with carbon improves the capacity retention rate in the cycle test of the three electrode laminate half cell compared to the cases with no coating. This is because the coating can lower the resistance.

The composite particles of Comparative Examples 1 to 3 are composite particles that do not satisfy the requirements of the above-described configuration example [1] of one embodiment of the present invention.

When the silicon content rate is about 40% by mass as in Comparative Example 1, deterioration of the electrode due to expansion and contraction of the Si—C composite appears to be small and a high capacity retention rate is obtained, but the powder compression density is 1.15 $g/cm^3$, which is relatively low, and in actual batteries, it is anticipated that only electrodes with low volumetric energy density can be obtained.

In addition, simply increasing the amount of silicon supported, as in Comparative Example 2, results in a lower capacity retention rate, possibly because deterioration of the electrode occurs significantly due to its expansion and contraction. Furthermore, the powder compression density is also low, which is possibly because the small diameter composite particles do not efficiently enter the gaps between the large diameter composite particles.

In Comparative Example 3, the proportion of small diameter composite particles is greater than 5%, but it can be seen that only satisfying this requirement is not enough to achieve the effects in the present invention.

In addition, Si—C composites produced without blending composite particles having different particle diameters and silicon content rates, as in Comparative Examples 1 to 3, the value of (y)/(x) fluctuates only slightly around 1.00, and does not reach 0.90 or less.

From the above, it can be seen that it is important to be able to achieve both the above-described proportion of the small diameter composite particles to be 5% or more and 45% or less, and the above-described (y)/(x) to be 0.90 or less. And in such a case, even when the silicon content rate of the entire composite particles is 45% by mass or more, the composite particles can provide batteries with good cycle characteristics, as can be seen from comparison of Examples 1 to 9 and Comparative Examples 1 to 3.

The invention claimed is:

1. Composite particles comprising silicon and carbon, wherein, when a cross-sectional diameter and a silicon content rate of the composite particles are measured by cross-sectional SEM-EDS and composite particles having a cross-sectional diameter of ½ or less of a number average of the cross-sectional diameter are defined as small diameter composite particles, a proportion of the number of the small diameter composite particles in the number of the composite particles measured is 5% or more and 50% or less, a ratio of an average silicon content rate (% by mass) of particles other than the small diameter composite particles to an average silicon content rate (% by mass) of the small diameter composite particles is 0.90 or less, and a silicon content rate of entire composite particles is 45% by mass or more.

2. The composite particles according to claim 1, wherein the carbon comprises a porous carbon material.

3. The composite particles according to claim 1, having a pore volume of 0.10 $cm^3/g$ or less.

4. The composite particles according to claim 1, wherein a ratio of an oxygen content rate (% by mass) to a silicon content rate (% by mass) is 0.001 or more and 0.300 or less.

5. The composite particles according to claim 1, wherein a peak is present between 450 and 495 $cm^{-1}$ in a Raman spectrum.

6. The composite particles according to claim 1, wherein (peak height of SiC111 plane)/(peak height of Si111 plane) is 0.010 or less, in an XRD pattern as measured by powder XRD using a Cu-Kα radiation.

7. The composite particles according to claim 1, wherein, when the small diameter composite particles are analyzed by SEM-EDS, one or more elements selected from Al, Ti, V, Cr, Mn, Fe, Co, Ni, Y, Zr, Mo, Nb, La, Ce, Ta, and W are detected.

8. The composite particles according to claim 1, comprising:

5 to 50% by mass of composite particles(S) obtained by allowing a silane gas to act on porous carbon(S) having a $D_{V50}$ of 1.0 to 10.0 μm and a pore volume of 0.8 to 2.2 $cm^3/g$ to thereby fill in pores of the porous carbon (S) with silicon; and 50 to 95% by mass of composite particles (L) obtained by allowing a silane gas to act on porous carbon (L) having a $D_{V50}$ greater than that of the porous carbon(S) and a pore volume of 0.2 to 0.8 $cm^3/g$ to thereby fill in pores of the porous carbon (L) with silicon, provided that a sum of the composite particles(S) and the composite particles (L) is 100% by mass.

9. A negative electrode mixture layer comprising the composite particles according to claim 1.

10. A lithium-ion secondary battery comprising the negative electrode mixture layer according to claim 9.

* * * * *